United States Patent
Marsch et al.

(10) Patent No.: US 11,448,207 B2
(45) Date of Patent: Sep. 20, 2022

(54) VARIABLE DISPLACEMENT HYDRAULIC UNIT AND METHOD FOR OPERATING THE HYDRAULIC UNIT

(71) Applicant: Danfoss Power Solutions GmbH & Co. OHG, Neumünster (DE)

(72) Inventors: Suenje Marsch, Ehndorf (DE); Verena Jensen, Nordborg (DK); Maurice Markwirth, Flensburg (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 114 days.

(21) Appl. No.: 16/943,118

(22) Filed: Jul. 30, 2020

(65) Prior Publication Data
US 2021/0047928 A1 Feb. 18, 2021

(30) Foreign Application Priority Data

Jul. 31, 2019 (DE) .......................... 102019211466.0

(51) Int. Cl.
*F04B 49/00* (2006.01)
*F04B 49/06* (2006.01)
*F16H 61/435* (2010.01)

(52) U.S. Cl.
CPC .......... *F04B 49/002* (2013.01); *F04B 49/065* (2013.01); *F15B 2211/20553* (2013.01); *F15B 2211/633* (2013.01); *F15B 2211/6316* (2013.01); *F16H 61/435* (2013.01)

(58) Field of Classification Search
CPC ................ F16H 61/435; F15B 2211/88; F15B 2211/6652; F15B 2211/633; F15B 2211/6316; F15B 2211/255; F15B 2211/20553; F15B 2211/20546; F15B 21/14; F15B 21/02; F04B 49/065; F04B 49/002; F04B 1/324; F04B 1/295;
(Continued)

(56) References Cited

U.S. PATENT DOCUMENTS

| 5,682,315 | A | 10/1997 | Coutant et al. | |
|---|---|---|---|---|
| 9,932,957 | B2 * | 4/2018 | Thoms | F16H 61/42 |
| 10,227,996 | B2 * | 3/2019 | Thoms | F15B 13/0402 |

(Continued)

FOREIGN PATENT DOCUMENTS

| CN | 106168235 A | 11/2016 |
|---|---|---|
| CN | 106351902 A | 1/2017 |

(Continued)

*Primary Examiner* — Dustin T Nguyen
(74) *Attorney, Agent, or Firm* — McCormick, Paulding & Huber PLLC

(57) ABSTRACT

Variable displacement hydraulic unit comprising a displacement unit for setting/adjusting the position of an adjustment element in order to adjust the displacement volume of the hydraulic unit by means of an electronically driveable actuator. The actuator is electronically connected to an electronic control unit (ECU) and has a first electric conductive coil to position the adjustment element by the help of electro-magnetic forces. An electric energy harvesting device is located adjacent to the first coil of the actuator such that electric energy from power fluctuations in the first coil can be harvested inductively. The inductively harvested electric energy can be transmitted to an electric energy storage device.

20 Claims, 1 Drawing Sheet

(58) Field of Classification Search
CPC .......... F04B 1/26; F04B 1/2078; F04B 1/146; F04B 1/06; F01B 3/007; F01B 3/0023
See application file for complete search history.

(56) References Cited

U.S. PATENT DOCUMENTS

| | | | |
|---|---|---|---|
| 10,830,348 B2 * | 11/2020 | Marsch | ................. F16H 61/423 |
| 10,941,792 B2 * | 3/2021 | Thoms | ................. F15B 15/204 |
| 2019/0072118 A1 * | 3/2019 | Zientara | ................... F04B 9/08 |

FOREIGN PATENT DOCUMENTS

| | | |
|---|---|---|
| DE | 102012202162 A | 8/2012 |
| DE | 102017206415 A1 | 10/2018 |
| JP | 2009108987 A | 5/2009 |

* cited by examiner

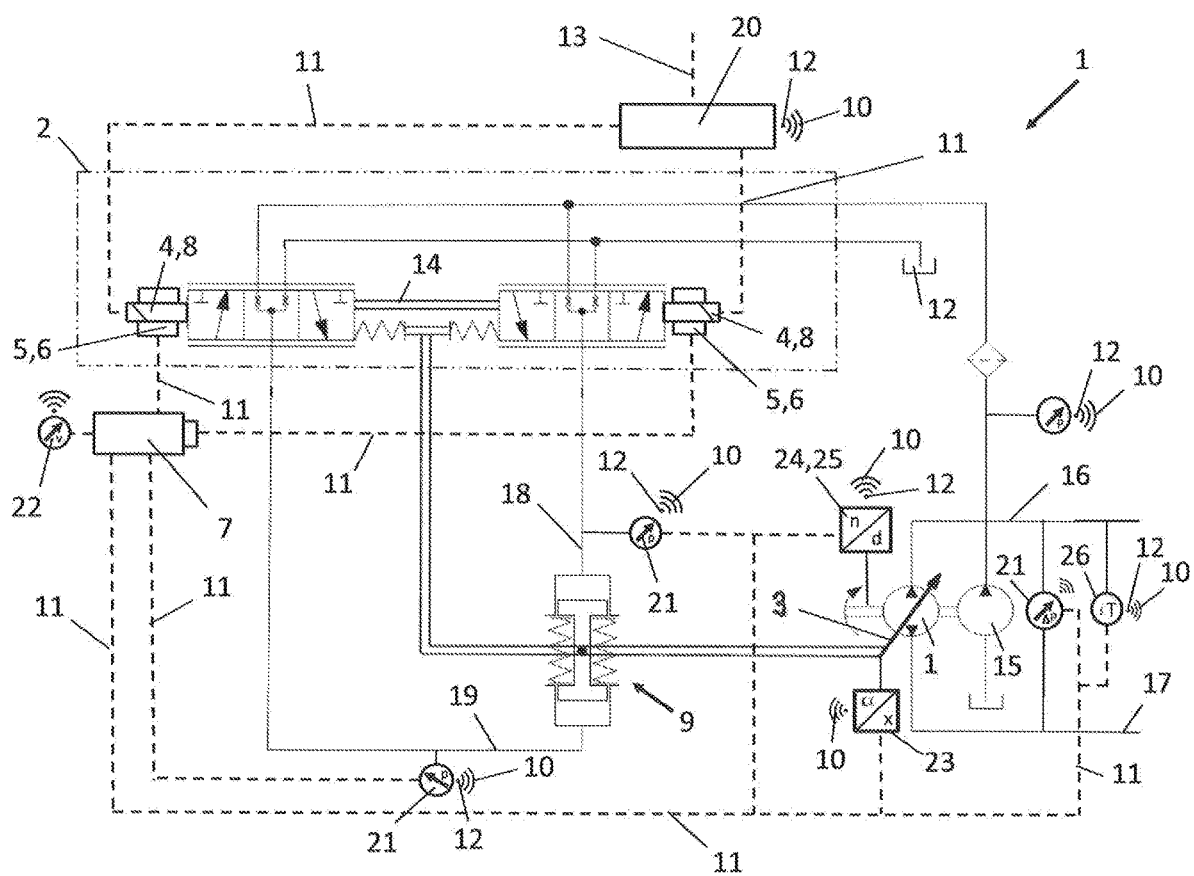

VARIABLE DISPLACEMENT HYDRAULIC UNIT AND METHOD FOR OPERATING THE HYDRAULIC UNIT

CROSS-REFERENCE TO RELATED APPLICATION

This application claims foreign priority benefits under 35 U.S.C. § 119 to German Patent Application No. 102019211466.0 filed on Jul. 31, 2019, the content of which is hereby incorporated by reference in its entirety.

TECHNICAL FIELD

The present invention relates to a hydraulic unit, in particular to a variable displacement hydraulic unit comprising a displacement unit for setting/adjusting the position of an adjustment element in order to set/adjust the displacement volume of the hydraulic unit. Sensors are commonly used to control, monitor and/or feedback operational parameters to an electronic control unit (ECU). The invention relates further to a method for upgrading existing variable displacement hydraulic units.

BACKGROUND

Hydraulic units of the variable displacement type of construction are very well known in the state of the art. These hydraulic units often comprise at least one sensor in order to determine operational parameters during operation of the hydraulic unit. These sensors are usually pressure sensors, flow sensors, angle sensors or the like, which transmit the sensed signal to an electronic control unit (ECU) for controlling the operational conditions of the hydraulic unit. The electronic control unit (ECU) processes these sensor signals and adjusts/sets the operational parameters according, e.g., to an operator command. The adjustments or settings of a hydraulic unit are frequently performed by energizing an electric driven actuator in order to shift a control device.

In common embodiments displacement units or displacement devices are used to transfer the commands of the electronic control unit via an electric driven actuator which changes the settings of a displacement element in the hydraulic unit. E.g., in hydraulic axial piston motors of the bent axis type the displacement element changes the bent angle/tilt angle defined between the cylinder block axis and the drive shaft axis. Thereby, the physical movement/displacement of the displacement element is caused by electro-magnetic, hydraulic or pneumatic forces. In order to create these displacement forces according to the command of the electronic control unit an electromagnetic driven actuator is used normally, for either actuating directly on the displacement element or indirectly to create hydraulic or pneumatic control forces acting on the displacement element.

For the control of the hydraulic unit and in order to set/adjust the displacement volume as well as to feedback optional parameters from the hydraulic unit to the electronic control unit electric energy is used to power the necessary components. For powering these components a wiring or at least a bus system is necessary in order to maintain the functionality of the components as well as the communication between the components. However, all these electric connections, like wires, harnesses or bus systems have to be installed in the hydraulic unit and/or hydraulic transmissions and/or vehicles driven by such hydraulic transmissions with care and do have accordingly a negative impact on the manufacturing costs of a hydraulic unit. Furthermore, these wires, electric connections or bus systems may be a source of failure within a hydraulic unit or a hydraulic system, like e.g. a hydraulic transmission.

DE 10 2017 206 415 A1 shows a variably adjustable hydraulic unit with an integrated, self-sustaining electrical power source, which is arranged in or on the housing and supplies at least the control unit and the actuator with energy. The electrical power source is a generator which can be driven directly or indirectly by a rotating element of the rotational group or by the hydraulic flow within the hydraulic unit.

SUMMARY

Therefore, it is an object of the invention to reduce the number of electric connections and to provide more robust and cost effective hydraulic units and hydraulic systems, in particular, hydraulic propel applications with a reduced cabling and wiring.

The object is solved by the invention by means of a variable displacement hydraulic unit according to claim 1 and a method for operating such a hydraulic unit according to claim 13. The variable displacement unit according to the invention comprises a displacement unit for setting/adjusting the position of a displacement element in order to set/adjust the displacement volume of the hydraulic unit. For this purpose an electronically drivable actuator is electronically connected to an electronic control unit for commanding the electronically driveable actuator. The electronically driveable actuator comprises a first electric conductive coil for creating electro-magnetic forces with which the adjustment element can be positioned when the supply of power to the electronic drivable actuator is changed. When the supply of power to the electronically driveable actuator is changed, electro-magnetic forces are generated in order to transform electronic signals (commands) from the electronical control unit (ECU) into a movement of a plunger, rod, or the like. This movement of the plunger can move directly or indirectly the displacement element or a servo piston of a servo unit in order to adjust the displacement volume of the hydraulic unit.

For a person skilled in the art it is obvious that the displacement or adjustment of the adjustment element in order to set/adjust/control the displacement volume of the hydraulic unit can be performed by various types of displacement units, as servo units or the like. For simplification reasons and mere exemplarily for explaining the inventive idea such a displacement unit can be a servo unit acting on a yoke of a bent axis axial piston unit. Thereby, for instance, the servo piston of the servo unit can be displaced by means of an electronically drivable actuator, e.g. a solenoid, which comprises a first electric conductive coil.

According to the invention an electric energy harvesting device is located adjacent to the first coil of the electronically drivable actuator such that electric energy from power fluctuations in the first coil can be harvested inductively, as every power fluctuation is accompanied by a change in the magnetic field, generated by every current-carrying conductor. These fluctuations in the magnetic field can be used to induct current in a second conductor/coil. Further, this inductively harvested electric energy can be transmitted—according to the invention—to an electric energy storage device, e.g. via a wiring. The harvested electrical energy stored in the electric energy storage device can be used subsequently for the powering of sensors, Bluetooth or NFC interfaces, or (further) actuators, for instance.

According to the invention the second coil is placed nearby the first coil such that fluctuations in the magnetic field of the first coil causes an induction in the second coil and electric energy is generated in the second coil. In sense of the invention the harvested electric energy can be conducted further to an electric storage device for storage and/or accumulation. Such an electric energy storage device according to the invention can be an electric capacitor, an accumulator or a rechargeable battery. In one embodiment according to the invention the electric energy storage device is an electric capacitor whose first plate is connected to the second coil for collecting harvested electric energy and whose second plate is connected with a sensor, e.g. In operation of the hydraulic unit the electric capacitor is charged by harvested electric energy. When the capacitor has reached its nominal charge the sensor connected to the second plate is energized such that he is capable to detect an operational parameter and to transmit a sensor signal to the electronic control unit (ECU). This sensor signal can be transmitted according to the invention, to the ECU by a wire or, preferably, wireless. In case of wireless transmission a further wiring for signal transmission can be avoided.

In an exemplary implementation of the inventive concept external energy supply to sensors, by means of wires, Bluetooth or NFC interfaces, or actuators can be avoided as electric energy can be generated directly at the hydraulic unit by inductively "stealing" electric energy when an electronically driven actuator is changed in its power supply. Hence, the power source of a hydraulic system, e.g. a hydraulic propel application, only has to provide electric power to the electronic control unit of an inventive variable displacement hydraulic unit. According to the invention, part of this electric energy is taken away inductively in order to energize attached or internal devices like interfaces, sensors, detectors or other electronic devices associated with the hydraulic unit or the hydraulic system. These devices preferably show a relative low electric energy consumption.

Preferably, as already indicated above, the harvested energy is used for powering internal sensors which transmit their sensor signals preferably in a wireless way to the electronic control unit of the hydraulic variable displacement unit and/or any other device of a hydraulic system, like a hydraulic propel application. Here, the used sensors are one or a multitude of: e.g., pressure sensors, angle sensors, linear sensors, position sensors, revolution sensors, linear speed sensors, acceleration sensors, temperature sensors, flow rate sensors, viscosity sensors, hall sensors, vibration sensors, tilt sensors, frequency sensors, charge sensors and/or any other sensors known in the art.

When using wireless sensors—as it is preferred by the invention—the electronic control unit of the hydraulic unit should be capable to receive these wireless transmitted sensor signals and should be capable to process the wireless received information in order to perform an adequate control signal to operate/command the hydraulic unit/-system adequately. Using wireless sensors which are powered by "harvested" energy according to the invention, provide the advantage that no external power source for energizing the sensors is necessary any longer. Further, corresponding external and internal wiring for energizing the sensors can be avoided especially for multi-part hydraulic systems. Furthermore, as wireless sensors do not need a line or a wire to transmit the sensor signal, even more wires connecting the receiving unit can be avoided, too. Hence, the hydraulic unit can be freed from wires substantially.

Preferably, according to the invention, the second coil for harvesting electric energy is located nearby a first solenoid, e.g. However, this solenoid do not have to be necessarily a solenoid of an actuator for changing the position of a displacement element. Such an actuator can also be used for fulfilling any other purpose in a hydraulic system. An example for this may be an actuator for switching valves or the like. In a concrete exemplary embodiment the solenoid may be used for shifting a control spool in the electronic displacement control unit (EDC) in order to guide pressurized hydraulic fluid under control pressure to a servo unit for adjusting the displacement volume of the hydraulic unit.

Another positive point of the invention lies in that already existing hydraulic units can be upgraded/refitted with the inventive idea. For this purpose an inventive electric energy harvesting device would have to be installed close to an electric driven actuator in order to enabling harvesting inductively electric energy. By installing an electric storage device, which can be a capacitor, an accumulator or a rechargeable battery, electric energy can be provided to a diversity of sensors for monitoring/sensing operational parameters with electric energy in a simple way. For the implementation of the inventive idea it is not necessary that the used sensors are of the wireless type of construction, however transmission of the sensed values in a wireless way to an electronic control unit is preferred. In case the electronic control unit of a hydraulic unit of the state of the art do not comprise a Bluetooth or NFC or any other wireless interface, wire lines for connecting the sensor output ports with the electronic control unit can be used, according to the invention, as well. So, there is no need to change the electronic control unit of already existent hydraulic units, when the inventive idea of harvesting electric energy is applied for powering operational sensors in a hydraulic unit.

In general the inventive variable displacement hydraulic unit can be of the axial piston type of construction or any other type of construction like a radial piston unit or an orbiter type unit. A person skilled in the art derives from the above that the inventive idea of harvesting electric energy from electronic driven actuators is applicable to all types of hydraulic units and is not limited to the exemplarily given embodiments.

BRIEF DESCRIPTION OF THE DRAWINGS

In the following by the attached FIGURE a preferred embodiment of the inventive concept is shown, exemplarily, with the help of a variable displacement hydraulic unit. However, the invention is not limited to the embodiment shown in the FIGURE and detailed below. Further, even not described, different embodiments can be combined or modified within the capabilities of a person with ordinary skills in the art without leaving the scope of the inventive idea. The FIGURE shows:

FIG. 1 schematically a circuit diagram for a variable displacement hydraulic unit according to the invention.

DETAILED DESCRIPTION

FIG. 1 shows schematically a circuit diagram for an inventive variable displacement hydraulic unit 1. Mere exemplarily a hydrostatic pump for a closed circuit is shown in FIG. 1. As already mentioned above the inventive idea is not limited neither to hydrostatic pumps nor to closed circuits. The inventive idea would easily be applicable also to the charge pump 15 shown in FIG. 1. This charge pump 15, too, could be controlled in its operational parameters. Following this at least a person skilled in the art would detect that the inventive idea is also applicable on hydrostatic motors, and therefore to hydrostatic systems, in particular to hydrostatic propel applications or hydrostatic transmissions.

The variable displacement hydraulic unit 1 which is shown in FIG. 1 is controlled by an electronic control unit (ECU) 20 which is connected via electric power supply lines 11 with actuators 8. These actuators 8 shown in FIG. 1 are solenoids, e.g., which can displace a control spool 14, if energized, based on a corresponding command of electronic control unit 20. When the solenoids, i.e. the actuators 8 are changed in their power supply with electric current the first electric conductive coils 4 in the actuators 8 create a mechanical force based on the electro-magnetic effect. Thereby control spool 14 can be shifted out of its middle position which is shown in FIG. 1.

When control spool 14 is shifted towards one side servo lines 18 conduct pressurized hydraulic fluid towards one side of the servo unit 9. When the servo unit 9 is pressurized on one side, an adjustment element 3 of the variable displacement hydraulic unit 1 is displaced due to mechanical linkage to the servo unit 9. By changing the position of the adjustment element 3 the displacement volume of the variable displacement hydraulic unit 1 is changed. This general functioning of a variable displacement hydraulic unit 1 with an electronic displacement control (EDC) 2 and a servo unit 9 is well known to a person with ordinary skills in the art.

According to the invention nearby the first electric conductive coils (solenoids) 4 electric energy harvesting devices 5 are located, having a second electric conductive coil 6. These second electric conductive coils 6 may be arranged around the first electric conductive coils 4 or may be arranged inside the first electric conductive coils 4, wherein interwrapped coils are also encompassed by the inventive idea. By placing the first electric conductive coils 4 close to the second electric conductive coils 6 any change in electric current supplied to the first electric conductive coils 4 create a change in the magnetic field in and around the first coils 4 thereby inducting electric current in the second electric conductive coils 6. This induced electric current is conducted via electric power lines 11 to an electric energy storage device 7. From this electric energy storage device 7 electric energy is supplied to different sensors 21 to 26 in the hydraulic unit/hydraulic system or hydraulic propel drive. Mere for explanation reasons only, a selection of sensors is shown in FIG. 1, like a pressure sensor 21 for the servo line 18 or another pressure sensor 21 for the other servo line 19. Other sensors like a speed sensor 24, an acceleration sensor 25 or an angle sensor 23 as well as a temperature sensor 26 or a differential pressure sensor 21 are shown exemplarily in the schematic hydraulic circuit of FIG. 1. All these sensors 21 to 26 are capable to sense/detect operational parameters of the variable displacement hydraulic unit and are furthermore capable to transmit the detected operational parameter in a wireless way to the electronic control unit (ECU) 20. For this each sensor as well as the electronic control unit 20 show a Bluetooth or NFC interface 12 or another wireless interface 12 for transmitting and/or receiving a wireless signal 10 to or from the electronic control unit 20.

At least a person with ordinary skills in the art derives from the schematic circuit diagram of FIG. 1 that the wireless signals 10 transmitted from the sensors 21 to 26 are received wireless by the electronic control unit 20 and can be processed by the electronic control unit 20 into commands to be transmitted to the actuators 8 of the electronic displacement unit 2, e.g. This may cause a change in the electric current to the first coils 4 of the actuator 8, which induct current in the second coils 6 for charging the electric storage device 7. Therewith a closed control circuit for the inventive variable displacement hydraulic unit is given. Operator commands are received by the electronic control unit 20 via an input line 13 and controlled by taking into account the feedback of the sensors. A correspondent signal can be transferred via power lines 11 to the actuators 8 such that the performance of the variable displacement hydraulic unit corresponds to the operator command.

A person with skills in the art further derives from the schematic diagram of FIG. 1 that the inventive concept manage all energy and information traffic with a minimum number of electric lines. Such a person skilled in the art further detects also that groups of sensors can be connected in series too, as only electric power current have to be transmitted to each of the sensors by means of wires. In hydraulic units of the state of the art, for each sensor a separate signal line is necessary for transmitting the detected signal from the sensor to the electronic control unit 20. All these signal lines are no longer necessary as—preferred by the invention—all sensors transmit its sensed signal via Bluetooth or NFC or other wireless interfaces 12.

Hence, with implementing the inventive idea a great amount of wiring or harness can be saved, which reduces the manufacturing costs significantly and augments the reliability of hydraulic units to which the inventive idea is implemented. Thereby all kind of hydraulic units and systems are covered by the inventive idea.

Finally the inventive idea provides for a cost effective and robust system for harvesting electric energy in order to reduce the amount of wiring within a hydraulic unit. Hydraulic units equipped with the inventive idea can be used in any kind of hydraulic applications and are preferably used in hydraulic propel applications for monitoring and controlling the operational parameters for an effective energy consumption throughout each used hydraulic unit and the whole hydraulic system.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A variable displacement hydraulic unit comprising a displacement unit for setting/adjusting the position of an adjustment element in order to adjust the displacement volume of the hydraulic unit by means of an electronically driveable actuator, wherein the actuator comprises a first electric conductive coil to position the adjustment element by the help of electro-magnetic forces, and is electronically connected to an electronic control unit (ECU), wherein a second conductor is located adjacent to the first coil of the actuator such that electric energy from power fluctuations in the first coil can be harvested inductively and, the inductively harvested electric energy can be transmitted to an electric energy storage device.

2. The hydraulic unit according to claim 1, wherein the second conductor is a second electric conductive coil surrounding, being surrounded by or being integrated in the first coil of the actuator.

3. The hydraulic unit according to claim 2, wherein the electric energy storage device is an electric capacitor, an accumulator or a rechargeable battery.

4. The hydraulic unit according to claim 2, further comprising a sensor supplied with electric power by the electric energy storage device.

5. The hydraulic unit according to claim 1, wherein the electric energy storage device is an electric capacitor, an accumulator or a rechargeable battery.

6. The hydraulic unit according to claim 5, further comprising a sensor supplied with electric power by the electric energy storage device.

7. The hydraulic unit according to claim 1, further comprising a sensor supplied with electric power by the electric energy storage device.

8. The hydraulic unit according to claim 7, wherein the sensor is capable to transmit a wireless signal to the electronic control unit (ECU).

9. The hydraulic unit according to claim 8, wherein the sensor is one or a plurality of sensors selected from a group comprising: a pressure sensor, an angle or linear sensor, a position sensor, a revolution or linear speed sensor, an acceleration sensor, a temperature sensor, a flow rate sensor, a viscosity sensor, a hall sensor, a vibration sensor, a tilt sensor, a frequency sensor, and a charge sensor.

10. The hydraulic unit according to claim 8, wherein the sensor transmits wireless signals which can be received and processed by the electronic control unit (ECU) for controlling the hydraulic unit.

11. The hydraulic unit according to claim 7, wherein the sensor is one or a plurality of sensors selected from a group comprising: a pressure sensor, an angle or linear sensor, a position sensor, a revolution or linear speed sensor, an acceleration sensor, a temperature sensor, a flow rate sensor, a viscosity sensor, a hall sensor, a vibration sensor, a tilt sensor, a frequency sensor, and a charge sensor.

12. The hydraulic unit according to claim 7, wherein the sensor transmits wireless signals which can be received and processed by the electronic control unit (ECU) for controlling the hydraulic unit.

13. The hydraulic unit according to claim 1, wherein the actuator is a solenoid for changing the position of the adjustment element.

14. The hydraulic unit according to claim 1, wherein the adjustment element is an electro-magnetic driven control spool of an electronic displacement control unit (EDC) for guiding hydraulic fluid under control pressure to a servo unit for adjusting the displacement volume of the hydraulic unit.

15. The hydraulic unit according to claim 1, wherein the hydraulic unit is an axial piston hydraulic unit.

16. The hydraulic unit according to claim 1, wherein the hydraulic unit is a radial piston hydraulic unit, wherein the displacement unit is configured to change the eccentricity of the adjustment element.

17. A hydraulic system for hydraulic propel applications in an open or closed hydraulic circuit comprising at least one hydraulic unit according to claim 1.

18. A method for upgrading or operating a hydraulic unit comprising a displacement unit for setting/adjusting the position of an adjustment element in order to adjust the displacement volume of the hydraulic unit by means of an electronically driveable actuator having a first electric conductive coil to position the adjustment element by the help of electro- magnetic forces, and wherein the actuator is electronically connected to an electronic control unit (ECU), comprising the steps of:
- locating a second conductor adjacent to the first coil of the actuator;
- harvesting electrical energy by means of induction, when power fluctuations occur in the first coil;
- transmitting the harvested energy to an electric energy storage device.

19. The method according to claim 18, further comprising the step of powering sensors installed in the hydraulic unit with power from the electric energy storage device.

20. The method according to claim 19, further comprising the step of transmitting sensor signals of sensed operational parameters by the sensors in a wireless way to the electronic control unit (ECU) and controlling the operation of the hydraulic unit by the help of the sensor signals processed by a microcontroller.

* * * * *